(12) United States Patent
Cochran

(10) Patent No.: US 9,440,787 B1
(45) Date of Patent: Sep. 13, 2016

(54) PLATFORM FOR SUPPORTING AND MOVING A BULK SEED CONTAINER OR THE LIKE

(71) Applicant: Stacy W. Cochran, Lamar, NE (US)

(72) Inventor: Stacy W. Cochran, Lamar, NE (US)

( * ) Notice: Subject to any disclaimer, the term of this patent is extended or adjusted under 35 U.S.C. 154(b) by 29 days.

(21) Appl. No.: 14/010,660

(22) Filed: Aug. 27, 2013

(51) Int. Cl.
*E04G 1/15* (2006.01)
*B65D 90/12* (2006.01)

(52) U.S. Cl.
CPC .................... *B65D 90/12* (2013.01)

(58) Field of Classification Search
CPC ............ E04G 3/00; E04G 3/24; E04G 5/00; E04G 5/14; E04G 5/08; E04G 1/15; B65D 90/12
USPC ........ 182/222, 113; 414/414, 607, 608, 785; 366/26
See application file for complete search history.

(56) References Cited

U.S. PATENT DOCUMENTS

| | | | |
|---|---|---|---|
| 1,332,063 A * | 2/1920 | Powers | 366/26 |
| 3,318,473 A * | 5/1967 | Jones et al. | 414/608 |
| 4,075,711 A * | 2/1978 | Hall | 366/26 |
| 4,953,752 A * | 9/1990 | Tousignant et al. | 222/23 |
| 4,956,821 A * | 9/1990 | Fenelon | 366/8 |
| 5,094,356 A | 3/1992 | Miller | |
| 5,333,757 A * | 8/1994 | Volk et al. | 222/94 |
| 5,339,996 A * | 8/1994 | Dubbert et al. | 222/185.1 |
| 5,609,417 A * | 3/1997 | Otte | 366/137 |
| 5,676,460 A * | 10/1997 | Biberstine et al. | 366/54 |
| 5,845,799 A | 12/1998 | Deaton | |
| 6,010,022 A | 1/2000 | Deaton | |
| 6,206,249 B1 * | 3/2001 | Lang et al. | 222/412 |
| 6,435,581 B1 * | 8/2002 | House et al. | 294/68.1 |
| 6,666,573 B2 * | 12/2003 | Grassi | 366/26 |
| 7,086,342 B2 | 8/2006 | O'Neall et al. | |
| 7,214,028 B2 * | 5/2007 | Boasso et al. | 414/812 |
| D588,166 S * | 3/2009 | Lyons, III | D15/19 |
| 8,201,520 B2 * | 6/2012 | Meritt | 119/53 |
| 8,434,990 B2 * | 5/2013 | Claussen | 414/332 |
| 8,573,917 B2 * | 11/2013 | Renyer | 414/523 |
| 2003/0076737 A1 * | 4/2003 | Grassi | 366/150.1 |
| 2004/0011592 A1 * | 1/2004 | Lee et al. | 182/187 |
| 2004/0237337 A1 * | 12/2004 | Laramore et al. | 34/588 |
| 2007/0207485 A1 * | 9/2007 | Deppermann et al. | 435/6 |

FOREIGN PATENT DOCUMENTS

FR 000774635 A * 12/1934 ............. B65D 90/12

OTHER PUBLICATIONS

Google search engine, Definition of Platform, Dec. 10, 2015, 1 page.*

* cited by examiner

*Primary Examiner* — Charles A Fox
*Assistant Examiner* — Kristine Florio
(74) *Attorney, Agent, or Firm* — Dennis L. Thomte; Thomte Patent Law Office LLC

(57) ABSTRACT

A platform for supporting and moving a bulk seed container or the like including a horizontally disposed worker support platform frame having at least one worker support platform positioned thereon. The platform frame has a supporting structure for supporting a bulk seed container thereon. The platform frame may have a discharge chute thereon.

5 Claims, 4 Drawing Sheets

PLATFORM FOR SUPPORTING AND MOVING A BULK SEED CONTAINER OR THE LIKE

BACKGROUND OF THE INVENTION

1. Field of the Invention

This invention relates to a platform for supporting and moving a bulk seed container or the like. More particularly, the platform of this invention has at least one and preferably two worker support platforms associated therewith.

2. Description of the Related Art

Bulk seed systems have been in wide use for many years to eliminate the need for filling row planter boxes and grain drills with seed from individual bags. A popular type of bulk seed box is that which is manufactured by Buckhorn, Inc. of Milford, Ohio, who is the owner of U.S. Pat. Nos. 5,845,799 and 6,010,022 relating to bulk boxes. Pioneer Hi-bred International, Inc., of Johnston, Iowa, markets agricultural seeds in large bulk boxes under the registered trademark PRO-BOX®. See also U.S. Pat. Nos. 5,094,356 and 7,086,342 which disclose bulk seed boxes having discharge doors or slide gates.

The bulk seed boxes of Buckhorn, Inc. and Pioneer have a sliding discharge door at the lower ends thereof through which the seed in the bulk box is dumped into a seed system, wagon, truck, etc. When the large bulk seed boxes are delivered to a farmer or the like, the bulk seed box is normally elevated above the ground by means of a lift apparatus such as a forklift or a front end loader so that the contents of the bulk seed box may be dumped into a seed system, wagon or truck so that the seed may be conveyed therefrom into the planting devices. The fact that the bulk seed boxes are elevated above the seed system, wagon, truck or the like requires that a person climb upwardly on a ladder to manually open the discharge door and to observe the contents of the bulk seed box.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A platform is described for supporting and moving a bulk seed container with the container having a lower end, an upper end, a first end, a second end, a first side and a second side. The container has a discharge opening centrally positioned at the lower end thereof. The container also includes a slide gate which is accessible at the first end of the container for opening and closing the discharge opening of the container. The container also includes first and second horizontally spaced-apart fork openings formed therein adjacent the lower end thereof.

The platform of this invention includes a horizontally disposed worker support platform frame having a first end, a second end, a first side and a second side. A first horizontally disposed worker support platform is positioned on the first end of the worker support platform frame. A second horizontally disposed worker support platform is positioned on the second end of the worker support platform frame. A container support structure, having upper and lower ends, is secured to the worker support platform frame which extends upwardly from the worker support platform frame between the first and second worker support platforms.

A horizontally disposed pan is mounted on the upper end of the container support structure with the pan having a first end, a second end, a first side and a second side. The container support structure has horizontally disposed and horizontally spaced-apart first and second fork receiving tubes which extend between the first and second sides of the container support structure below the pan and which are configured to selectively receive the forks of a lift apparatus therein whereby the worker support platform frame, the first and second worker support platforms, the container support structure and the pan may be moved, elevated and lowered as required.

A worker or operator may stand on either of the worker support platforms as the platform and the container thereon are elevated above a bulk seed system, truck, wagon, etc. The worker standing on the work support platform may open and close the slide as required. The worker may also observe the contents of the container.

An optional additive supply structure is also provided on the platform whereby the worker may add additive to the bulk seed being discharged therefrom.

It is therefore a principal object of the invention to provide a platform for supporting and moving a bulk seed container.

A further object of the invention is to provide a platform of the type described which has one or two worker support platforms thereon.

A further object of the invention is to provide a platform of the type described which also includes an additive supply structure at one side thereof whereby a worker standing on a work support platform may add additives to the bulk seed being discharged from the container.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
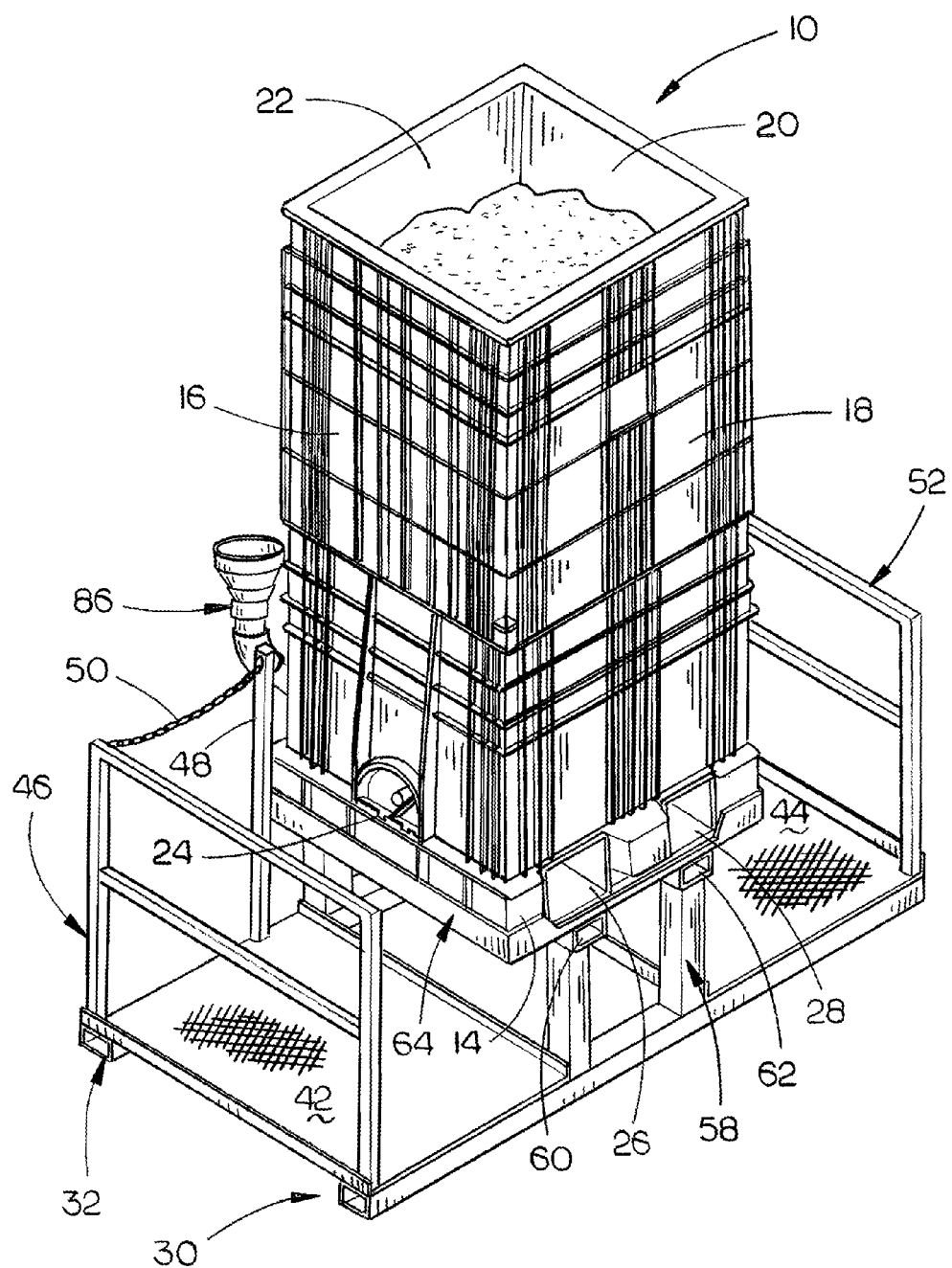
FIG. 1 is a perspective view illustrating a bulk seed container mounted on the platform of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a bulk seed container 10 such as that described and shown in U.S. Pat. Nos. 5,845,799 and 6,010,022. Bulk seed container 10 has an upper end 12, a lower end 14, a first side 16, a second side 18, a third side 20 and a fourth side 22. Container 10 has a central hopper bottom having a discharge opening formed therein which is selectively closable by a slide gate 24 in conventional fashion. The slide gate 24 is accessible from the lower end of side 16. Container 10 has a pair of fork openings or tubes 26 and 28 extending between sides 18 and 22 at the lower ends thereof. The fork openings 26 and 28 are designed to receive the forks or tines of a lift apparatus 29 such as a fork lift or a front end loader. The upper end of container 10 will usually be selectively closed by a cover or lid. Although the platform structure of this invention is ideally suited for use with a bulk seed container, the container could contain other particulate material such as cement, sand, gravel, chemicals, etc.

The platform structure of this invention is generally referred to by the reference numeral 30. Platform structure 30 includes a horizontally disposed worker support platform frame 32, having a first end 34, a second end 36, a first side 38 and a second side 40. A first worker support platform 42 is positioned on worker support platform frame 32 at end 34, as seen in the drawings. A second worker support platform 44 is positioned on worker support platform frame 32 at end 36, as also seen in the drawings.

Figure 2:
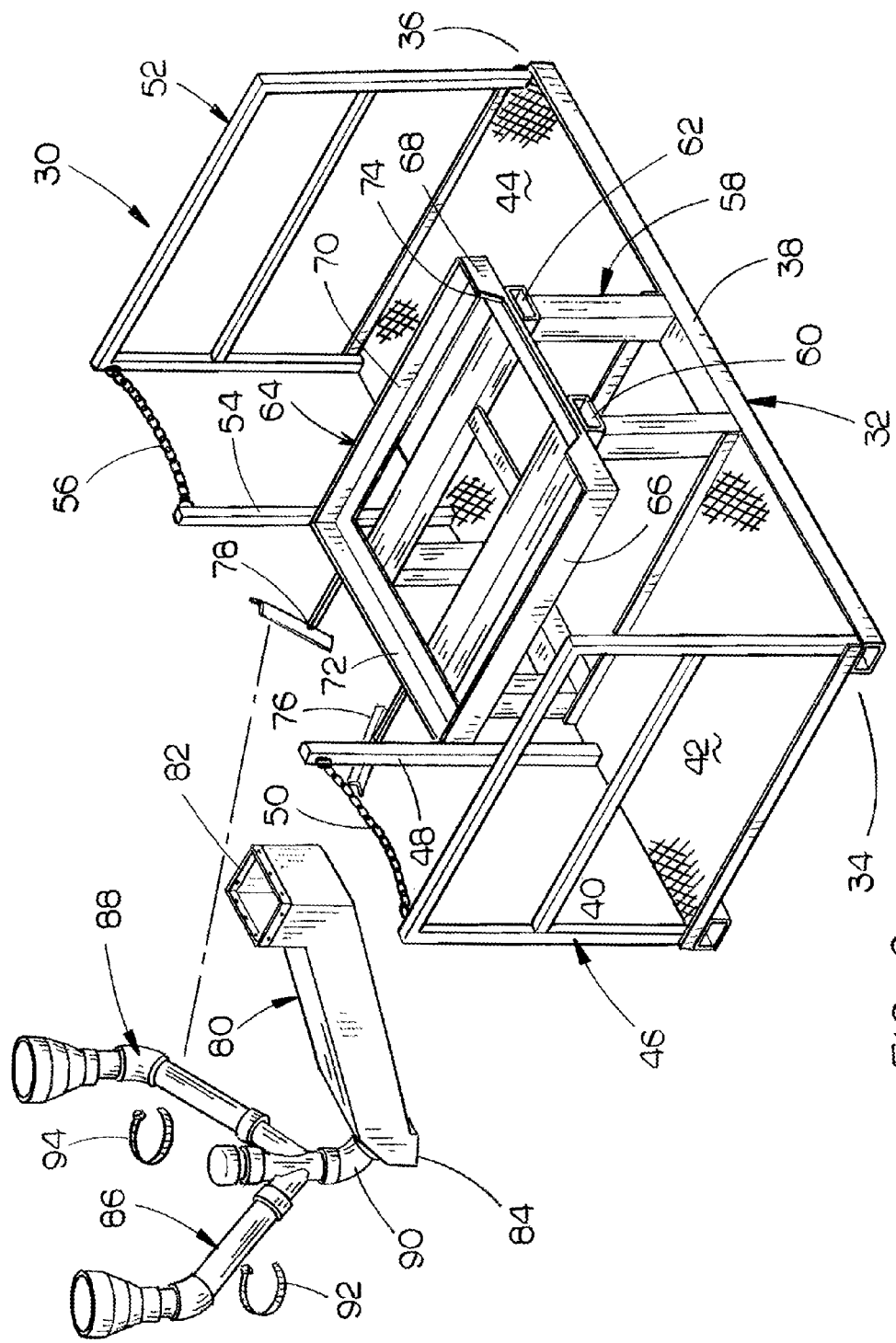
FIG. 2 is an exploded perspective view of the platform of this invention.
Figure 3:
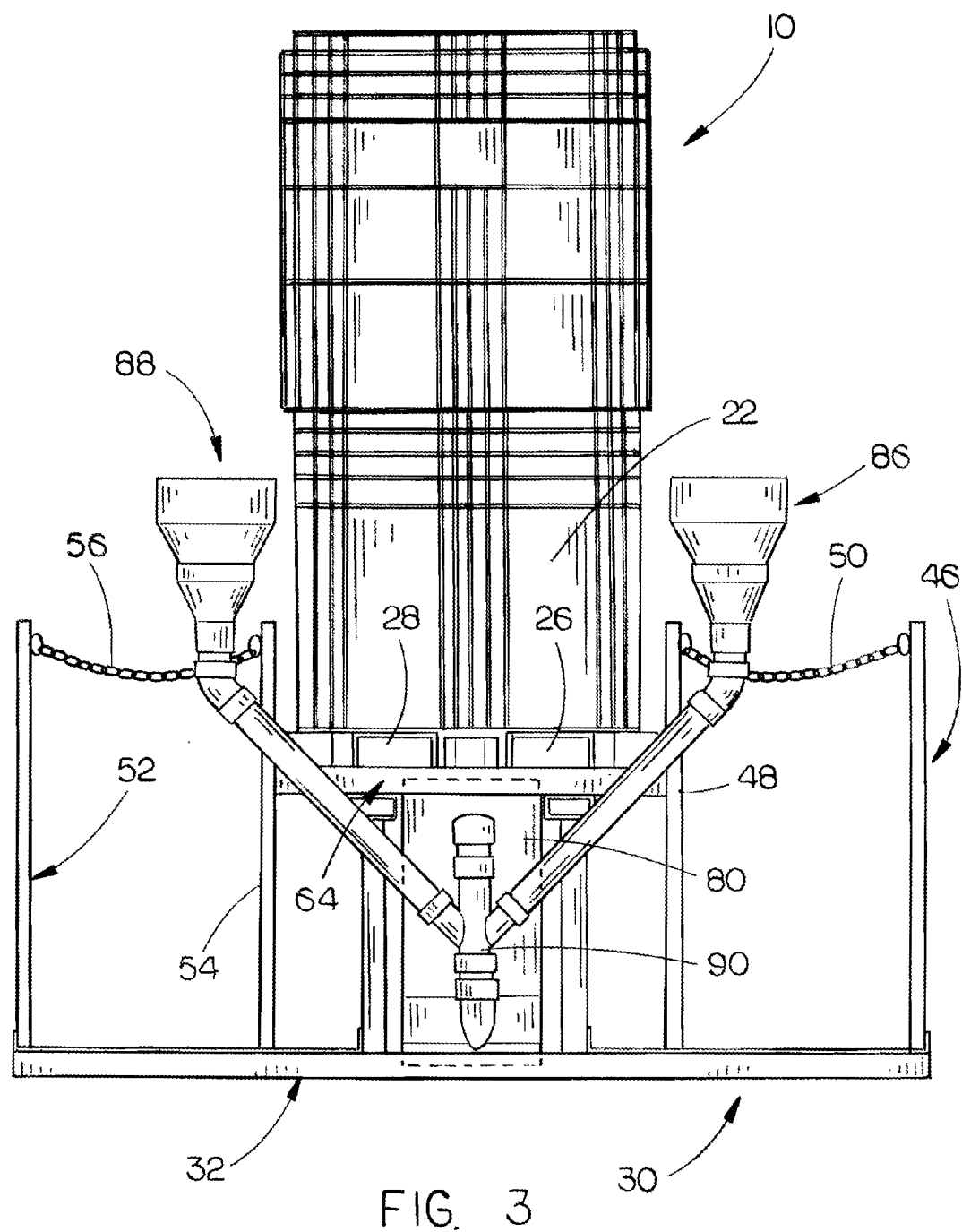
FIG. 3 is a side elevational view of the platform of this invention.
Figure 4:
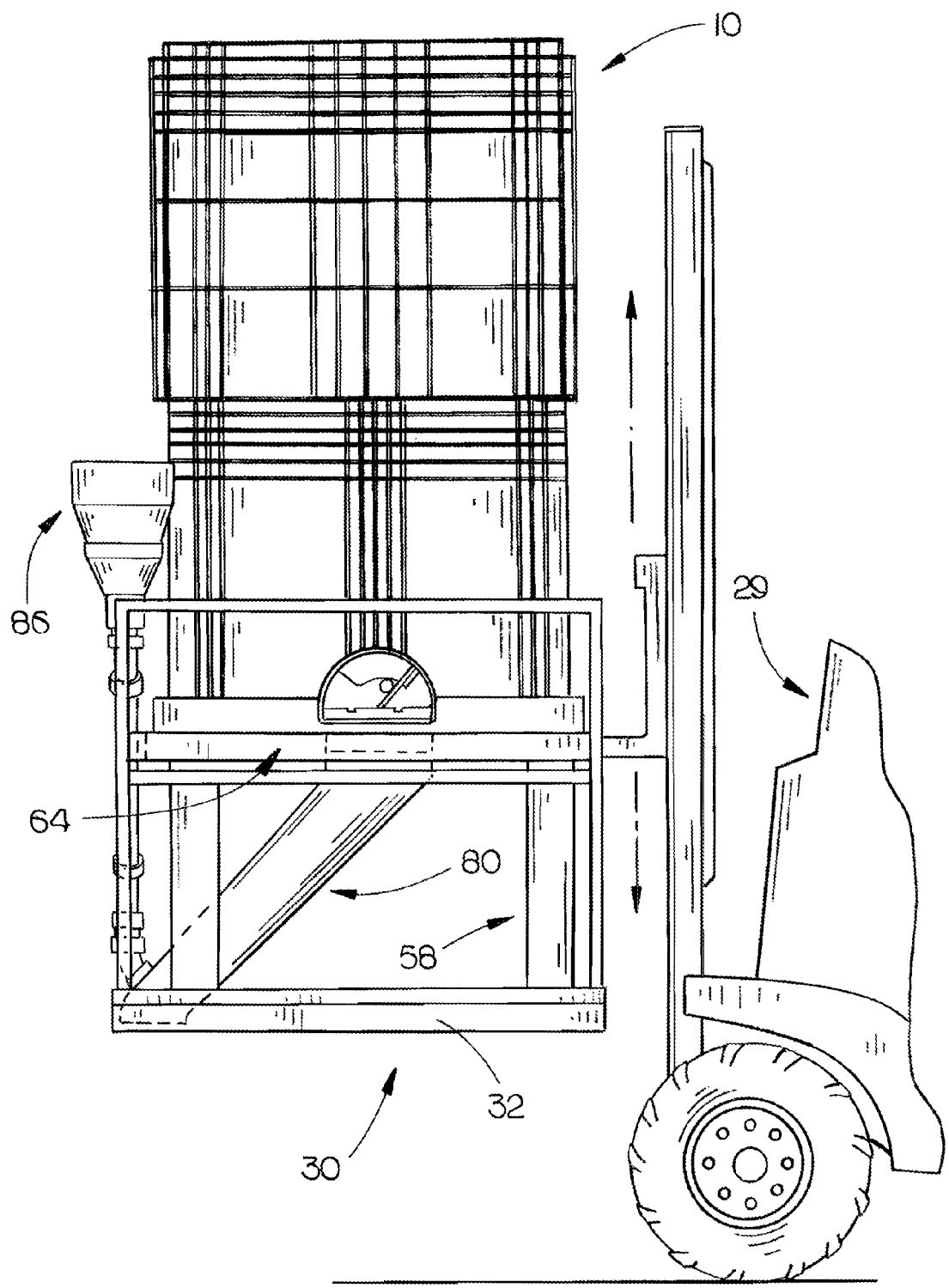
FIG. 4 is another side view of the platform of this invention with the platform being raised or lowered by a lift apparatus.

A safety railing 46 is secured to platform frame 32 at end 34 thereof and extends upwardly therefrom. A safety support post 48 extends upwardly from side 40 of platform frame 32. One end of safety chain 50 is selectively secured to the upper end of post 48 with the other end of chain 50 being secured to one end of the safety railing 46, as seen in FIG. 1. A safety railing 52 is secured to worker support platform frame 32 at end 36 thereof and extends upwardly therefrom. A safety support post 54 extends upwardly from side 40 of worker support platform frame 32. One end of a safety chain 56 is selectively secured to the upper end of post 54 with the other end of chain 56 being secured to one end of the safety railing 52, as seen in FIG. 2.

The numeral 58 refers to a container support structure which is secured to worker support platform frame 32 between worker support platforms 42 and 44 and extends upwardly therefrom. A pair of fork receiving openings or tubes 60 and 62 are provided at the upper end of container support structure 58 which are adapted to receive the forks or tines of a lift apparatus 29 such as a fork lift or front end loader. The numeral 64 refers to a container support pan which is mounted on tubes 60 and 62. Support pan 64 includes frame or pan members 66, 68, 70 and 72 which are in the form of angles having upstanding wall portions. The upstanding wall of frame member 68 is cut-away at 74.

An optional support bracket 76 has its inner end secured to support structure 64 so as to extend outwardly from side 40 of platform frame 32. An optional support bracket 78 has its inner end secured to support structure 58 so as to extend outwardly from side 40 of platform frame 32 in a spaced relationship to support bracket 76.

The numeral 80 refers to an optional seed discharge chute which is secured to support structure 58 so that the intake end 82 of chute 80 is in communication with the discharge opening of the container 10 positioned on pan 64. The lower discharge end 84 of chute 80 is positioned outwardly of platform frame 32. The numerals 86 and 88 refer to additive supply tubes having open upper ends into which additives may be introduced. The lower ends of tubes 86 and 88 are in communication with a manifold 90 which is in communication with chute 80 above the discharge end 84. The tubes 86 and 88 are secured to the support brackets 76 and 78 respectively by any conventional means such as bands 92 and 94.

In some cases, the platform 30 will not utilize the additive tubes 86 and 88. In that situation, the discharge chute 80 may not be used with the seed being discharged from the discharge opening of the container 10 downwardly through the support structure 58.

In use, the bulk seed box 10 is lifted and positioned by the lift apparatus 29 so that the lower end of the box 10 is positioned on the container support pan 64. At that time, if the discharge chute 80 is being utilized, the upper intake end thereof will be in communication with the discharge opening of the container 10. At that time, the lower ends of additive supply tubes will be in communication with the discharge chute 80.

The lift apparatus 29 will then insert its forks into the ends of tubes 60 and 62 and will raise and move the platform structure 30 and the container 10 thereon to position the discharge end 84 of the discharge chute 80 over a bulk seed system, wagon, truck, etc. Prior to lifting and moving the platform structure 10, etc., a worker will move onto either of the worker support platforms 42 or 44.

When the platform structure 30, etc. has been positioned over the bulk seed system, truck, etc., the worker standing on either of the worker supply platforms 42 or 44, preferably the worker supply platform 42, may open the slide gate 24 so that the seed in the container 10 may be discharged therefrom into the discharge chute 80. The worker may introduce an additive or additives into the seeds by depositing the same into one or more of the tubes 86 and 88.

The worker on either of the worker support platforms has the ability of observing the level of the seed within the container 10. The worker also has ready access to the slide gate 24 to close or open the same as required. When the seed has been discharged from the container, the worker will close the slide gate 24. The lift apparatus may then be utilized to lower the platform structure 30 and the container 10 to the ground. The worker may then move from the platform structure.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A platform for supporting and moving a bulk seed container with the container having a lower end, an upper end, a vertically disposed first side, a vertically disposed second side, a vertically disposed third side, a vertically disposed fourth side, a discharge opening centrally positioned at the lower end thereof, a slide gate which is accessible at the first side of the container for opening and closing the discharge opening thereof, and first and second horizontally spaced-apart fork openings formed therein at the lower end thereof, comprising:
  a horizontally disposed worker support platform frame;
  said worker support platform frame comprising:
    (a) an elongated and horizontally disposed first frame member having first and second ends;
    (b) an elongated and horizontally disposed second frame member horizontally spaced from said first frame member and having first and second ends;
    (c) a horizontally disposed first worker support platform having an inner end, an outer end, a first side and a second side;
    (d) said first worker support platform being positioned on and secured to said first ends of said first and second frame members so as to extend therebetween with said first side of said first worker support platform being positioned on said first frame member and with said second side of said first worker support platform being positioned on said second frame member;
    (e) a horizontally disposed second worker support platform having an inner end, an outer end, a first side and a second side;
    (f) said second worker platform being positioned on and secured to said second ends of said first and second frame members so as to extend therebetween with said first side of said second worker support platform being positioned on said first frame member and with said second side of said second worker support platform being positioned on said second frame member;
    (g) said inner ends of said first and second worker support platforms being spaced apart;
  a container support structure, having upper and lower ends, fixedly secured to said first frame member of said worker support platform frame and to said second frame member of said worker support platform frame which extends upwardly from said worker support platform frame between said inner end of said first worker support platform and said inner end of said second worker support platform;
  a horizontally disposed pan fixedly mounted on said upper end of said container support structure;
  said pan including an elongated and horizontally disposed first frame member having first and second ends, an elongated and horizontally disposed second frame member having first and second ends, an elongated and horizontally disposed third frame member having first and second ends, and an elongated and horizontally disposed fourth frame member having first and second ends;
  said first frame member of said pan, said second frame member of said pan, said third frame member of said pan, and said fourth frame member of said pan being joined together to form a container support;
  each of said first, second, third and fourth frame members of said pan having an angular cross-section with a base portion having inner and outer sides and an upstanding wall portion extending upwardly from the outer side of the base portion whereby the lower end of the container may be supported on the base portions of said first, second, third and fourth frame members of said pan inwardly of the upstanding wall portions thereof;
  said outer end of said first worker support platform being horizontally spaced outwardly of said first frame member of said pan;
  the horizontal spacing of said outer end of said first worker support platform from said first frame member of said pan enabling a worker to stand on said first worker support platform at one side of the container;
  said outer end of said second worker support platform being horizontally spaced outwardly of said third frame member of said pan;
  the horizontal spacing of said outer end of said second worker support platform from said third frame member of said pan enabling a worker to stand on said second worker support platform at another side of the container;
  said container support structure having horizontally disposed and horizontally spaced-apart first and second fork receiving tubes extending between said first and second sides of said container support structure below said pan which are configured to selectively receive the forks of a lift apparatus therein whereby said worker support platform frame, said first worker support platform, said second worker support platform, said container support structure, said pan and the container may be moved by the lift structure.

2. The platform of claim 1 wherein said container support structure has an inclined discharge chute, having upper and lower ends, secured thereto, said upper end of said discharge chute being in communication with the discharge opening of the bulk seed container positioned on said pan, said lower end of said discharge chute being positioned at said second side of said worker support platform frame.

3. The platform of claim 2 wherein an additive feed conduit, having upper and lower ends, is in communication with said discharge chute between said upper and lower ends thereof for adding an additive to seed being discharged from said discharge chute.

4. The platform of claim 3 wherein a plurality of additive feed conduits are in communication with said discharge chute.

5. A platform for supporting a container with the container having a lower end, an upper end, a vertically disposed first side, a vertically disposed second side, a vertically disposed third side, a vertically disposed fourth side, a discharge opening centrally positioned at the lower end thereof, a slide gate which is accessible at the first side of the container for opening and closing the discharge opening thereof, and first and second horizontally spaced-apart fork openings formed therein at the lower end thereof, comprising:
  a horizontally disposed worker support platform frame;
  said worker support platform frame comprising:
    (a) an elongated and horizontally disposed first frame member having first and second ends;
    (b) an elongated and horizontally disposed second frame member horizontally spaced from said first frame member and having first and second ends;
    (c) a horizontally disposed first worker support platform having an inner end, an outer end, a first side and a second side;
    (d) said first worker support platform being positioned on and secured to said first ends of said first and second frame members so as to extend therebetween with said first side of said first worker support platform being positioned on said first frame member and with said second side of said first worker support platform being positioned on said second frame member;
  a container support structure, having upper and lower ends, fixedly secured to said first and second frame members of said worker support platform frame which extends upwardly from said worker support platform frame at said inner end of said first worker support platform;

a horizontally disposed pan fixedly mounted on said upper end of said container support structure;

said pan including an elongated and horizontally disposed first frame member having first and second ends, an elongated and horizontally disposed second frame member having first and second ends, an elongated and horizontally disposed third frame member having first and second ends, and an elongated and horizontally disposed fourth frame member having first and second ends;

said first, second, third and fourth frame members of said pan being joined together to form a container support;

each of said first, second, third and fourth frame members of said pan having an angular cross-section with a base portion having inner and outer sides and an upstanding wall portion extending upwardly from the outer side of the base portion whereby the lower end of the container may be supported on the base portions of said first, second, third and fourth frame members of said pan inwardly of the upstanding wall portions thereof;

said outer end of said first worker support platform being horizontally spaced outwardly of said first frame members of said pan;

the horizontal spacing of said first worker support platform from said first frame member of said pan enabling a worker to stand on said first worker support platform at one side of the container;

said container support structure having horizontally disposed and horizontally spaced-apart first and second fork receiving tubes extending between said first and second sides of said container support structure below said pan which are configured to selectively receive the forks of a lift apparatus therein whereby said worker support platform frame, said first worker support platform, said container support structure, said pan and the container may be moved by the lift structure.

* * * * *